United States Patent
Chien et al.

(10) Patent No.: US 11,223,392 B2
(45) Date of Patent: Jan. 11, 2022

(54) RADIO MODULE CONFIGURATIONS FOR ANTENNAS

(71) Applicant: HEWLETT-PACKARD DEVELOPMENT COMPANY, L.P., Spring, TX (US)

(72) Inventors: Jeremy Chien, Taipei (TW); Yu-Hao Liu, Taipei (TW); Min-Hsu Chuang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/481,475

(22) PCT Filed: Jul. 18, 2017

(86) PCT No.: PCT/US2017/042547
§ 371 (c)(1),
(2) Date: Jul. 28, 2019

(87) PCT Pub. No.: WO2019/017897
PCT Pub. Date: Jan. 24, 2019

(65) Prior Publication Data
US 2020/0244318 A1  Jul. 30, 2020

(51) Int. Cl.
*H04B 7/0413* (2017.01)
*H04B 7/0404* (2017.01)
*H04B 7/06* (2006.01)

(52) U.S. Cl.
CPC ......... *H04B 7/0413* (2013.01); *H04B 7/0404* (2013.01); *H04B 7/0608* (2013.01)

(58) Field of Classification Search
CPC ........................... H04B 7/0413; H04L 5/1423
See application file for complete search history.

(56) References Cited

U.S. PATENT DOCUMENTS

| | | | |
|---|---|---|---|
| 7,920,099 B2 | 4/2011 | Chiu et al. | |
| 9,363,005 B2* | 6/2016 | Mahe | H04W 52/0245 |
| 9,496,932 B1 | 11/2016 | Prendergast et al. | |
| 2008/0082828 A1* | 4/2008 | Jennings | H04L 9/3247 |
| | | | 713/176 |
| 2008/0130599 A1 | 6/2008 | Horikoshi et al. | |
| 2009/0322621 A1 | 12/2009 | Inanoglu et al. | |
| 2010/0077190 A1 | 3/2010 | Brown et al. | |

(Continued)

FOREIGN PATENT DOCUMENTS

EP    3119010 A1    1/2017

OTHER PUBLICATIONS

"Design and Analysis of Two Port MIMO Antennas with Wideband Isoloation", 2013.

*Primary Examiner* — Raj Jain
(74) *Attorney, Agent, or Firm* — Tong, Rea, Bentley & Kim LLC

(57) ABSTRACT

In example implementations, a mobile device is provided. The mobile device includes a first antenna, a second antenna, a radio module and a memory. The radio module includes four antenna ports. The first antenna is in communication with a first port of the four antenna ports and the second antenna is in communication with a second port of the four antenna ports. The memory stores a configuration of the radio module that deactivates a third port and a fourth port of the four antenna ports of the radio module.

10 Claims, 4 Drawing Sheets

(56) References Cited

U.S. PATENT DOCUMENTS

| | | | |
|---|---|---|---|
| 2013/0183691 A1 | 7/2013 | Nakamura et al. | |
| 2015/0249489 A1* | 9/2015 | Xin | H04W 24/04 |
| | | | 370/329 |
| 2016/0301141 A1* | 10/2016 | Del Castillo | H01Q 11/10 |
| 2016/0366015 A1 | 12/2016 | Prendergast et al. | |
| 2017/0163293 A1* | 6/2017 | Lee | H04W 88/06 |
| 2020/0136681 A1* | 4/2020 | Chien | H04L 5/1423 |
| 2020/0244318 A1* | 7/2020 | Chien | H04B 7/0404 |

* cited by examiner

RADIO MODULE CONFIGURATIONS FOR ANTENNAS

BACKGROUND

Mobile devices have antennas to communicate wirelessly. Some large platform mobile devices can use four or more antennas to improve throughput and take advantage of current wireless communication standards to maximize throughput. Some small platform mobile devices may not have enough space for four antennas. As a result, the small platform mobile devices may use two antennas.

DETAILED DESCRIPTION

Examples described herein provide multiple input multiple output (MIMO) antenna configurations that allow different platforms with different numbers of antennas to use a single radio module. As discussed above, different mobile devices use different numbers of antennas. Currently, different radio modules are used based on the number of antennas contained in a mobile device.

However, having different radio modules for different mobile devices can add to inventory costs and overhead. In addition, simply using a single radio module without any modification (e.g., a 4×4 MIMO radio module with two connected antennas) can lead to interference, poor performance, wrong system information being sent to a base station, and decreased battery life in the mobile device.

Examples described herein provide different configurations for a single radio module having a plurality of antenna ports based on the number of antennas contained in a mobile device. For example, the radio module may have four antenna ports. For a mobile device that uses two antennas, the radio module may be modified to deactivate two of the antenna ports. As a result, a single radio module may be used for different mobile devices with different numbers of antennas. Using a single radio module for different mobile devices helps to streamline inventory and reduce overall costs.

Figure 1:
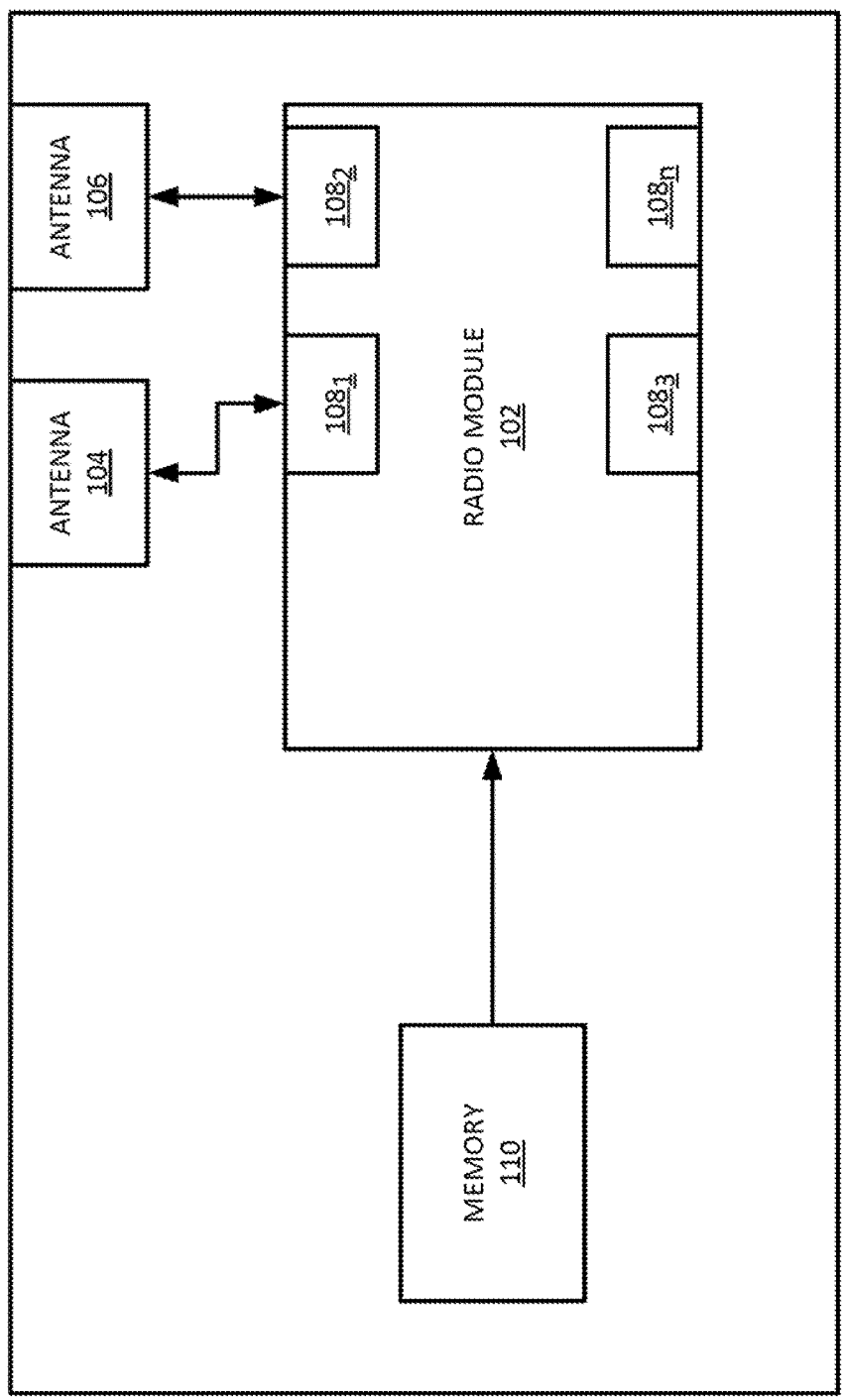
FIG. 1 is a block diagram of an example mobile device of the present disclosure.

FIG. 1 illustrates a block diagram of a mobile device 100. In one example, the mobile device 100 may be a mobile endpoint device such as a smart phone, a lap top computer, a tablet computer, and the like.

In one example, the mobile device 100 may include a radio module 102, a first antenna 104, a second antenna 106, a memory 110. The memory 110 may be used to store configuration information of the radio module 102, as discussed in further detail below. The radio module 102 may include a plurality of antenna ports $108_1$ to $108_n$ (hereinafter referred to individually as an antenna port 108 or collectively as antenna ports 108).

In one example, the antenna 104 and the antenna 106 may be multiple input multiple output (MIMO) antennas. For example, MIMO antennas may be used communicate wirelessly with a base station, router, gateway, and the like. MIMO wireless technology may be used to multiply the capacity of a radio link using multiple transmit and receive antennas for wireless communication to and from wireless communication systems using various standards (e.g., 802.11 Wi-Fi standards, 3G, 4G, long term evolution (LTE), and the like).

In one example, the radio module 102 may control data transmission and reception via the first antenna 104 and the second antenna 106. The radio module 102 may process data that is received and forward the data to a processor (not shown) of the mobile device 100 for further processing (e.g., for storage, for display to the user via a user interface, and the like).

It should be noted that although two antennas 104 and 106 are illustrated, any number of antennas may be deployed as long as the number of antennas is less than the number of antenna ports 108 of the radio module. As noted above, a single radio module 102 may be kept in inventory for mobile devices that use any number of antennas up to the number of antenna ports 108 of the radio module 102. As a result, inventory costs can be reduced.

The first antenna 104 may be coupled to the antenna port $108_1$ and the second antenna 106 may be coupled to the antenna port $108_2$ of the radio module 102. The radio module 102 may be configured to operate as a two antenna port radio module and deactivate the unused antenna ports (e.g., the antenna ports $108_3$ through $108_n$).

Figure 2:
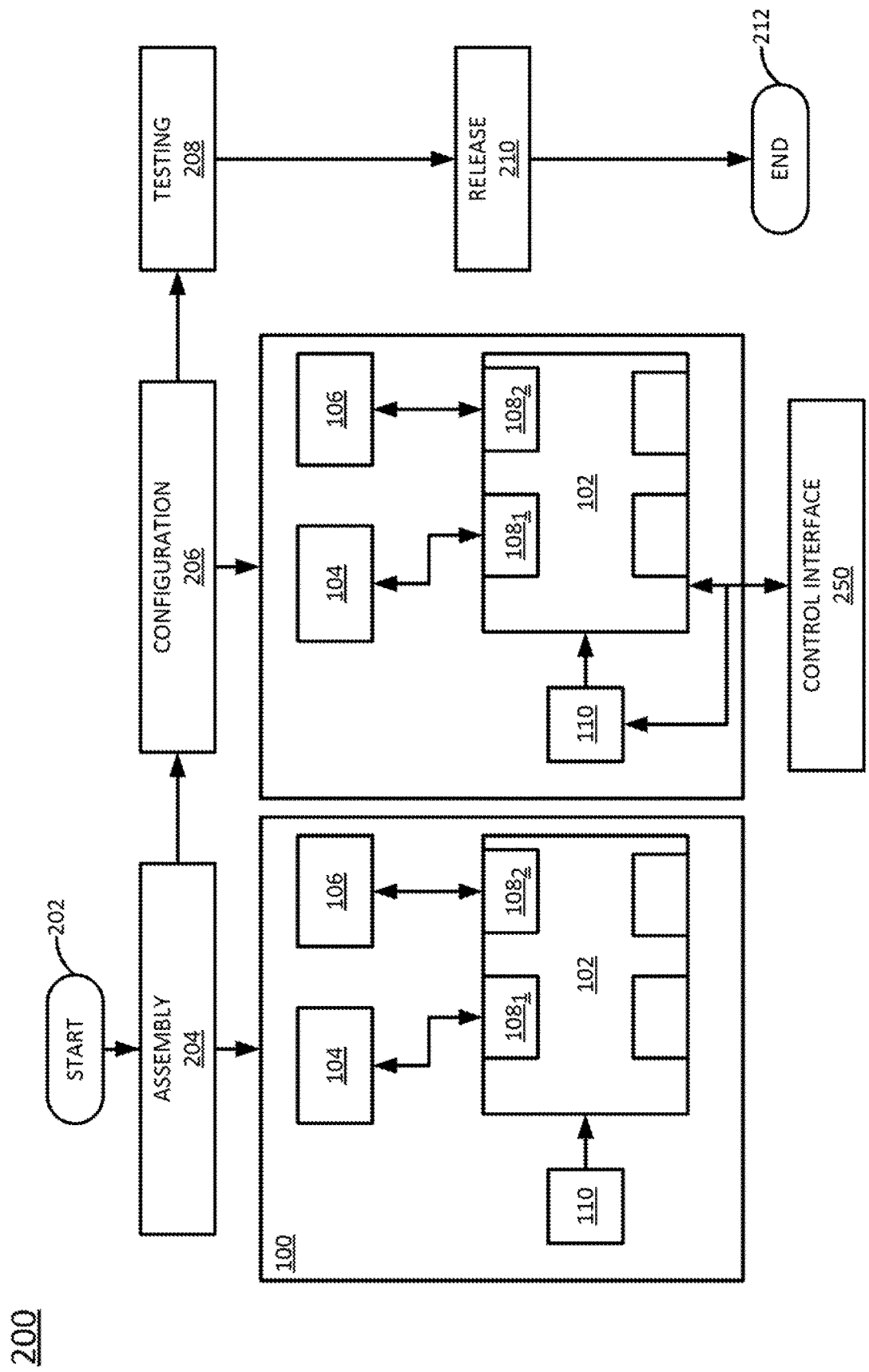
FIG. 2 is a process flow diagram of an example method for an assembly line configuration of the mobile device.

FIG. 2 illustrates an example process flow 200 for an assembly line configuration of the mobile device 100. The process flow 200 may begin at block 202. At block 204, the process flow 200 may perform assembly of the mobile device 100. In one example, part of the assembly may include installing the radio module 102, the first antenna 104, the second antenna 106, the memory 110, as well as other components that are not shown. The first antenna 104 and the second antenna 106 may be coupled to respective antenna ports $108_1$ and $108_2$.

At block 206, the process flow 200 may perform configuration of the radio module 102. The radio module 102 may be configured to deactivate unused antenna ports (e.g., the antenna ports $108_3$ through $108_n$). As a result, the radio module 102 may operate as a two antenna port radio module. Deactivation of the unused antenna ports (e.g., the antenna ports $108_3$ through $108_n$) may prevent interference and prevent unnecessary battery consumption, which if not prevented may lead to poor battery life of the mobile device 100.

In one example, the radio module 102 may be configured by a controller/interface 250 of the assembly line. The controller/interface 250 may include a processor to control operations of various tools of the assembly line. The controller/interface 250 may also include an interface to access a chipset of the radio module 102 to allow the radio module 102 to be properly configured.

In one example, the controller/interface 250 may detect a number of antennas in the mobile device 100 and a number of antenna ports 108 on the radio module 102. The controller/interface 250 may then configure the radio module 102 to deactivate the unused antenna ports 108.

In another example, controller/interface 250 may allow a technician to manually configure the radio module 102. The configuration may then be stored in the memory 110.

In one example, the configuration may be stored in the memory 110 of the mobile device 100. The memory 110 may be non-volatile memory of the radio module 102 (e.g., a chipset of the radio module 102). In another example, the memory 110 may be non-volatile memory associated with a basic input/output system (BIOS) of the mobile device 100.

In other words, the configuration of the radio module 102 may be fixed during the assembly process 200 and stored in the memory 110 that cannot be overwritten, or changed, during operation. For example, the operational configuration of the radio module 102 does not change dynamically during operation of the radio module 102 and the mobile device 100. Rather, the mobile device 100 is assembled and configured to operate with a number of antennas that is less than a number of antenna ports 108 that are available on the radio module 102.

At block 208, the process flow 200 may perform testing of the configured radio module 102. The testing may include receiving a communication signal from the radio module 102, via the number of antennas (e.g., the antennas 104 and 106), that indicates that the radio module 102 has two antenna active antenna ports 108$_1$ and 108$_2$. For example, the controller/interface 250 of the assembly line may establish a communication path with the radio module 120 via the first antenna 104 and the second antenna 106 that are coupled to the respective antenna ports 108$_1$ and 108$_2$ of the radio module. A ping, or a query, may be transmitted from the controller/interface 250 of the assembly line to the mobile device 100. A response (e.g., the communication signal) may be transmitted from the mobile device over the communication path back to the controller, or a received level per antenna may be shown on the mobile device 100.

At block 210, the process flow 200 may release the mobile device 100 after successful testing. At block 212, the process flow 200 ends.

It should be noted that the mobile device 100 may include additional hardware components that are not shown. For example, the mobile device 100 may include a processor that is in communication with the memory 110 and the radio module 102. The processor may operate the radio module 102 in accordance with the configuration that is stored in the memory 110 and read by the processor. The mobile device 100 may also include hardware components such as a user interface (e.g., a keyboard or a touch screen interface), audio components, a display, and the like.

In one example, the mobile device 100 may be part of a wireless communication network. The mobile device 100 may establish a communication path with a base station to receive and transmit data over a wireless Internet protocol (IP) network. The mobile device 100 may operate using a number of antennas (e.g., the first antenna 104 and the second antenna 106) that is less than a number of antenna ports 108 that are available on the radio module 102.

In one example, the radio module 102 may report the two antenna configuration that is stored in the memory 110 to the base station during an initial process to establish the communication path. Thus, the base station may communicate with the radio module 102 via the first antenna 104 and the second antenna 106 as if the radio module 102 is a two antenna port module even though the radio module 102 may have more than two antenna ports.

Figure 3:
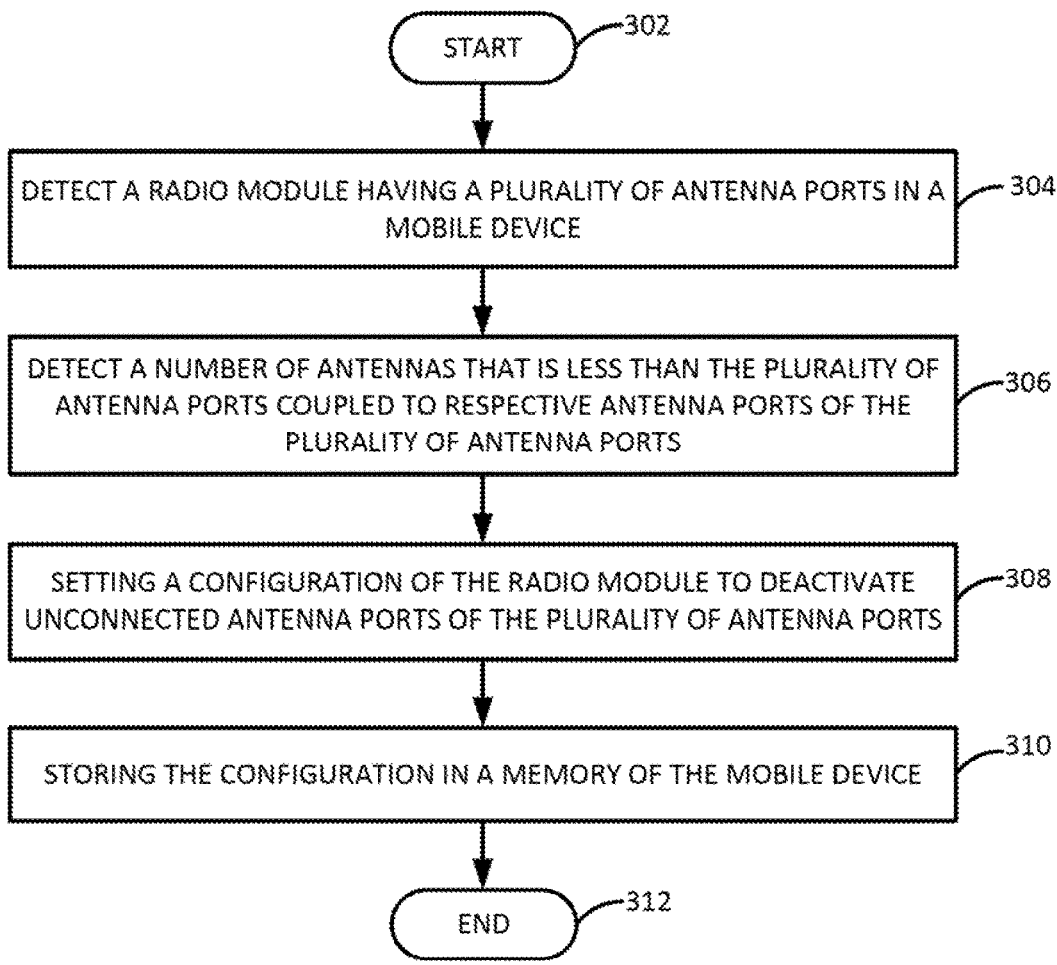
FIG. 3 is a flow diagram of an example method of configuring a radio module of the mobile device.

FIG. 3 illustrates a flow diagram of an example method 300 for configuring a radio module of a mobile device. In one example, the method 300 may be performed by a processor of a control interface during assembly and production of the mobile device.

At block 302, the method 300 begins. At block 304, the method 200 detects a radio module having a plurality of antenna ports in a mobile device. For example, during assembly of the mobile device a controller or a processor may be responsible for configuration of the radio module. The controller may read a memory of the mobile device that may store information related to how many antennas are deployed in the mobile device and how many antenna ports are available on the radio module. For example, the information may be a model number, part serial number, and the like, of the radio module that would indicate the number of available antenna ports.

At block 306, the method 300 detects a number of antennas that is less than the plurality of antenna ports coupled to respective antenna ports of the plurality of antenna ports. For example, the mobile device may be assembled with two antennas when a 4×4 radio module is deployed in the mobile device. As a result, two of the antenna ports of the radio module may be connected to the two antennas and two of the antenna ports of the radio module may be inactive or unused.

At block 308, the method 300 sets a configuration of the radio module to deactivate unconnected antenna ports of the plurality of antenna ports. In one example, the controller or a processor of the assembly line may establish access a non-volatile memory of the radio module, or a BIOS of the mobile device. The controller, or the processor, may then write into the non-volatile memory of the radio module, or the BIOS of the mobile device, the number of antennas that are connected to antenna ports of the radio module. As a result, two of the antenna ports may be deactivated to prevent battery usage to power the deactivated antenna ports and prevent potential interference from the deactivated antenna ports.

It should be noted that the radio module is configured to operate with a set number of antennas in the mobile device that is less than the number of antenna ports that are available on the radio module. In other words, present disclosure is not dynamically changing operation from four antennas to two antennas in a mobile device that has four antennas coupled to a radio module that has four antenna ports.

At block 310, the method 300 stores the configuration in a memory of the mobile device. For example, the memory may be a non-volatile memory of the radio module or a non-volatile memory associated with a BIOS of the mobile device that can be accessible by a processor of the mobile device. The processor may access the configuration and control operation of the radio module in accordance with the configuration that is stored.

In one example, the mobile device may be tested before release for purchase and activation by a consumer. For example, the operation of the radio module may be tested. The testing may include receiving a communication signal from the radio module, via the number of antennas, that indicates that the radio module has two antenna active antenna ports. For example, the controller or a processor of the assembly line may establish a communication path with the radio module via the antennas that are coupled to the respective antenna ports of the radio module. A ping, or a query, may be transmitted from the controller or processor of the assembly line to the mobile device. A response (e.g., the communication signal) may be transmitted from the mobile device over the communication path back to the controller, or a received level per antenna may be shown on the mobile device. At block 312, the method 300 ends.

Figure 4:
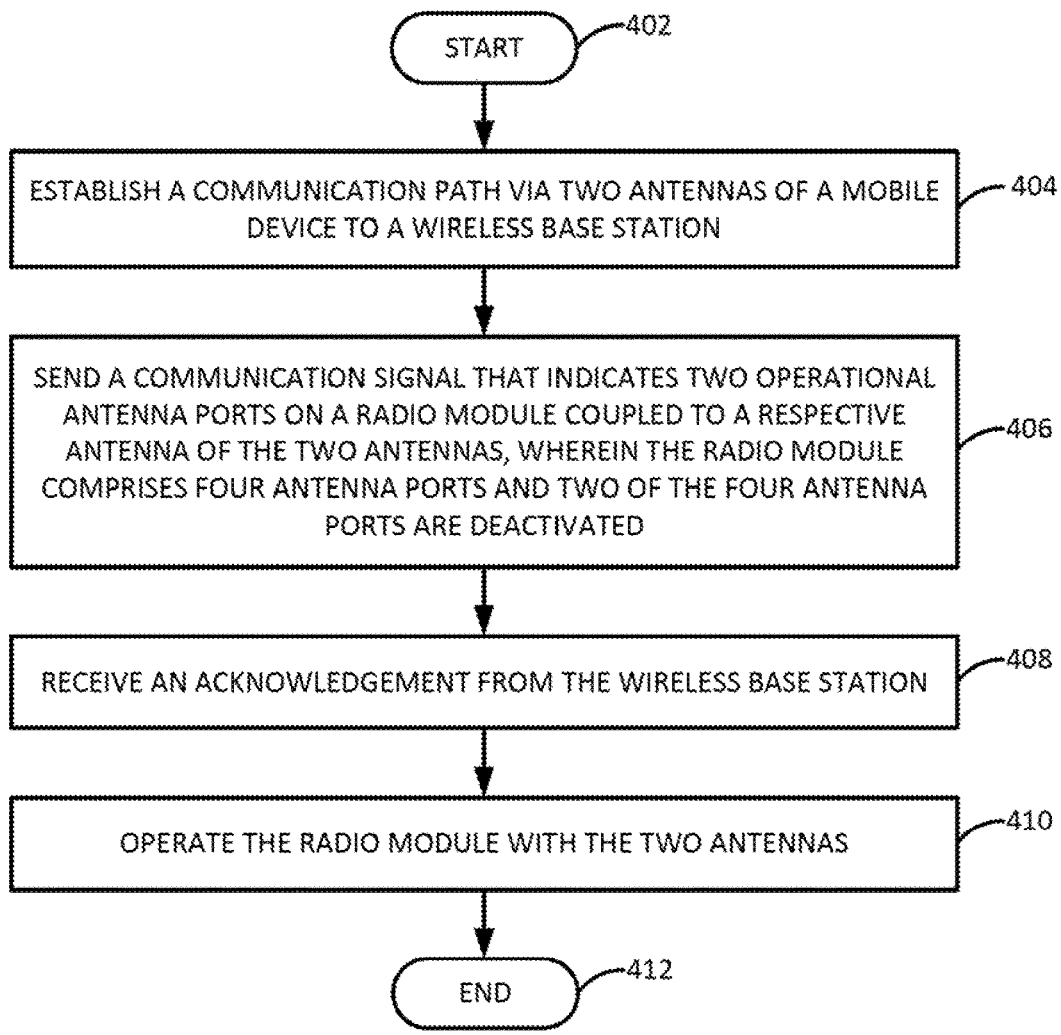
FIG. 4 is a flow chart of an example method for operating the radio module of the mobile device.

FIG. 4 illustrates a flow diagram of an example method 400 for operating a radio module of a mobile device. In one example, the method 400 may be performed by a processor that controls operation of the radio module in the mobile device. For example, the mobile device may be part of a wireless communication network (e.g., an IP network, a cellular data network, and the like) and the mobile device may use the radio module to communicate over the wireless communication network.

At block 402, the method 400 begins. At block 404, the method 400 establishes a communication path via two antennas of a mobile device to a wireless base station. In one example, the two antennas may be MIMO antennas that use a communication protocol such as 802.11 WiFi, 3G, 4G, LTE, and the like. The communication path may be a wireless communication path to the wireless base station to communicate with another endpoint device over an IP network or a server hosting a website, service, and the like, in the IP network.

At block 406, the method 400 sends a communication signal that indicates two operational antenna ports on a radio module coupled to a respective antenna of the two antennas, wherein the radio module comprises four antenna ports and two of the four antenna ports are deactivated. For example, the radio module deployed in the mobile device may have four antenna ports, which may be used for a 4×4 Wi-Fi solution to increase throughput rates. However, to minimize inventory costs a single radio module with four antenna ports may be deployed in various different mobile devices having different numbers of antennas For example, some small form factor mobile devices may not have enough room for four antennas and be assembled with two antennas. The radio module with four antenna ports may still be used with the two antennas. In one example, the radio module may be configured during assembly of the mobile device (e.g., during production or before activation by a consumer) to deactivate two of the antenna ports. Deactivation of unused antenna ports may prevent excessive battery consumption and interference. Thus, when the radio module may report a two antenna configuration to the wireless base station even though the radio module may have four antenna ports.

At block 408, the method 400 receives an acknowledgement from the wireless base station. In one example, the wireless base station may send an acknowledgement to the mobile device that the communication path has been established using a particular wireless communication protocol using the two antennas of the mobile device.

At block 410, the method 400 operates the radio module with the two antennas. For example, data may be transmitted or received by the radio module of the mobile device using the two antennas. At block 412, the method 400 ends.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A mobile device, comprising:
a first antenna;
a second antenna;
a radio module having four antenna ports, wherein the first antenna is in communication with a first port of the four antenna ports and the second antenna is in communication with a second port of the four antenna ports; and a memory to store a configuration of the radio module that deactivates a third port and a fourth port of the four antenna ports of the radio module, wherein the memory comprises a basic input/output system (BIOS) memory such that the configuration cannot be changed during operation of the mobile device.

2. The mobile device of claim 1, wherein the first antenna and the second antenna comprise multiple input multiple output (MIMO) antennas.

3. The mobile device of claim 1, wherein the memory comprises a non-volatile memory of the radio module.

4. A method, comprising:
detecting, by a processor, a radio module having a plurality of antenna ports in a mobile device;
detecting, by the processor, a number of antennas that is less than the plurality of antenna ports coupled to respective antenna ports of the plurality of antenna ports;
setting, by the processor, a configuration of the radio module to deactivate unconnected antenna ports of the plurality of antenna ports, wherein the configuration is fixed during operation of the mobile device; and
storing, by the processor, the configuration in a memory of the mobile device, wherein the memory comprises a basic input/output system (BIOS) memory such that the configuration cannot be changed during operation of the mobile device.

5. The method of claim 4, further comprising:
testing, by the processor, operation of the radio module.

6. The method of claim 5, wherein the testing comprises receiving a communication signal from the radio module, via the number of antennas, that indicates that the radio module has two active antenna ports.

7. The method of claim 4, wherein the plurality of antenna ports comprises four antenna ports.

8. The method of claim 4, wherein the number of antennas comprises two multiple input multiple output (MIMO) antennas.

9. The method of claim 4, wherein the memory comprises a non-volatile memory of the radio module.

10. A method, comprising:
establishing, by a processor, a communication path via two antennas of a mobile device to a wireless base station;
sending, by the processor, a communication signal that indicates two operational antenna ports on a radio module coupled to a respective antenna of the two antennas in accordance with a configuration of the radio module stored in a basic input/output system (BIOS) memory such that the configuration cannot be changed during operation of the mobile device, wherein the radio module comprises four antenna ports and two of the four antenna ports are deactivated, wherein deactivation of the two of the four antenna ports is fixed during operation of the mobile device;
receiving, by the processor, an acknowledgement from the wireless base station; and
operating, by the processor, the radio module with the two antennas.

* * * * *